(12) United States Patent
Galasso

(10) Patent No.: US 11,148,748 B2
(45) Date of Patent: Oct. 19, 2021

(54) METHODS AND APPARATUS FOR SELECTIVE STIFFNESS OF VEHICLE SUSPENSION

(71) Applicant: Fox Factory, Inc., Duluth, GA (US)

(72) Inventor: Mario Galasso, Sandy Hook, CT (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 16/852,283

(22) Filed: Apr. 17, 2020

(65) Prior Publication Data
US 2020/0239102 A1 Jul. 30, 2020

Related U.S. Application Data

(63) Continuation of application No. 15/885,648, filed on Jan. 31, 2018, now Pat. No. 10,625,811, which is a continuation of application No. 14/708,027, filed on May 8, 2015, now Pat. No. 9,884,664, which is a continuation of application No. 13/646,041, filed on Oct. 2, 2012, now Pat. No. 9,051,022, which is a continuation-in-part of application No. 12/623,788, filed on Nov. 23, 2009, now Pat. No. 8,366,130.

(60) Provisional application No. 61/543,730, filed on Oct. 5, 2011, provisional application No. 61/117,090, filed on Nov. 21, 2008, provisional application No. 61/117,466, filed on Nov. 24, 2008.

(51) Int. Cl.
| | |
|---|---|
| *B62K 25/08* | (2006.01) |
| *B62K 21/02* | (2006.01) |
| *F16F 1/38* | (2006.01) |
| *F16F 7/12* | (2006.01) |
| *B62K 25/04* | (2006.01) |

(52) U.S. Cl.
CPC .............. *B62K 25/08* (2013.01); *B62K 21/02* (2013.01); *B62K 2025/048* (2013.01); *F16F 1/38* (2013.01); *F16F 7/12* (2013.01)

(58) Field of Classification Search
CPC .. B62K 25/08; B62K 21/02; B62K 2025/048; F16F 1/38; F16F 7/12
See application file for complete search history.

(56) References Cited

U.S. PATENT DOCUMENTS

| | | | |
|---|---|---|---|
| 1,668,571 A | | 5/1928 | Niederberger et al. |
| 2,160,247 A | | 5/1939 | Anderson et al. |
| 3,438,650 A | | 4/1969 | Jaulmes |
| 4,124,208 A | | 11/1978 | Burns et al. |
| 4,170,369 A | | 10/1979 | Strutman |
| 4,561,669 A | * | 12/1985 | Simons .................. B62K 25/08 180/219 |

(Continued)

FOREIGN PATENT DOCUMENTS

| | | |
|---|---|---|
| JP | 01229788 A | 9/1989 |
| JP | 01229789 A | 9/1989 |

(Continued)

OTHER PUBLICATIONS

EPO Extended European Search Report dated Nov. 17, 2015, for EPO Patent Application No. 09176812.7.
Translation of JP 01-229789.

*Primary Examiner* — Kevin Hurley
*Assistant Examiner* — Marlon A Arce

(57) ABSTRACT

A suspension assembly including a core member; and a skin member bonded on said core member. The skin member having a higher strength than the core member.

17 Claims, 6 Drawing Sheets

(56) References Cited

U.S. PATENT DOCUMENTS

| | | | |
|---|---|---|---|
| 4,878,558 | A | 11/1989 | Asakura |
| 5,092,421 | A | 3/1992 | Tsurumaki et al. |
| 5,112,697 | A | 5/1992 | Sang et al. |
| 5,279,181 | A | 1/1994 | Boudreau et al. |
| 5,352,266 | A | 10/1994 | Erb et al. |
| 5,433,797 | A | 7/1995 | Erb et al. |
| 5,511,811 | A | 4/1996 | Pileggi |
| 5,544,907 | A | 8/1996 | Lin et al. |
| 5,553,880 | A | 9/1996 | McJunkin et al. |
| 5,908,200 | A | 6/1999 | Stewart |
| 5,927,740 | A | 7/1999 | Hopey |
| 5,967,538 | A | 10/1999 | Callaluca et al. |
| 6,017,047 | A * | 1/2000 | Hoose ................ B60G 3/01 280/276 |
| 6,109,637 | A | 8/2000 | Kirk |
| 6,109,638 | A | 8/2000 | Colegrove |
| 6,145,862 | A | 11/2000 | D'Aluisio et al. |
| 6,217,049 | B1 | 4/2001 | Becker |
| 6,244,609 | B1 | 6/2001 | Wilson |
| 6,352,276 | B1 | 3/2002 | Hill |
| 6,513,822 | B1 | 2/2003 | Chonan |
| 6,520,524 | B1 | 2/2003 | Costa |
| 6,592,136 | B2 | 7/2003 | Becker et al. |
| 6,783,141 | B1 | 8/2004 | Backhaus |
| RE38,669 | E | 12/2004 | Voss et al. |
| 6,837,508 | B2 | 1/2005 | Francis et al. |
| 6,893,037 | B1 | 5/2005 | Galasso |
| 7,163,223 | B2 | 1/2007 | Wesling et al. |
| 7,195,234 | B2 | 3/2007 | Jordan et al. |
| 7,320,832 | B2 | 1/2008 | Erb et al. |
| 7,354,354 | B2 | 4/2008 | Erb et al. |
| 7,387,578 | B2 | 6/2008 | Erb et al. |
| 7,425,009 | B2 | 9/2008 | Namazue et al. |
| 7,441,640 | B2 | 10/2008 | Russell |
| 7,641,984 | B2 | 1/2010 | Rabiei |
| 7,722,069 | B2 | 5/2010 | Shirai |
| 7,771,289 | B2 | 8/2010 | Erb et al. |
| 8,113,530 | B2 | 2/2012 | Pierick et al. |
| 8,366,130 | B2 | 2/2013 | Galasso et al. |
| 8,464,850 | B2 | 6/2013 | Fox |
| 9,604,693 | B2 | 3/2017 | Allinger et al. |
| 9,884,664 | B2 | 2/2018 | Galasso |
| 2003/0189308 | A1 | 10/2003 | Wegzyn et al. |
| 2005/0127636 | A1 | 6/2005 | Czysz |
| 2006/0220291 | A1* | 10/2006 | Costa ................ B62K 19/38 267/221 |
| 2007/0074939 | A1 | 4/2007 | Chen |
| 2008/0099968 | A1 | 5/2008 | Schroeder |
| 2009/0152042 | A1 | 6/2009 | Pierick et al. |
| 2013/0026730 | A1 | 1/2013 | Galasso et al. |
| 2017/0158282 | A1 | 6/2017 | Galasso et al. |
| 2018/0154977 | A1 | 6/2018 | Galasso |

FOREIGN PATENT DOCUMENTS

| | | |
|---|---|---|
| JP | 2004108431 A | 4/2004 |
| JP | 2006347386 A | 12/2006 |

* cited by examiner

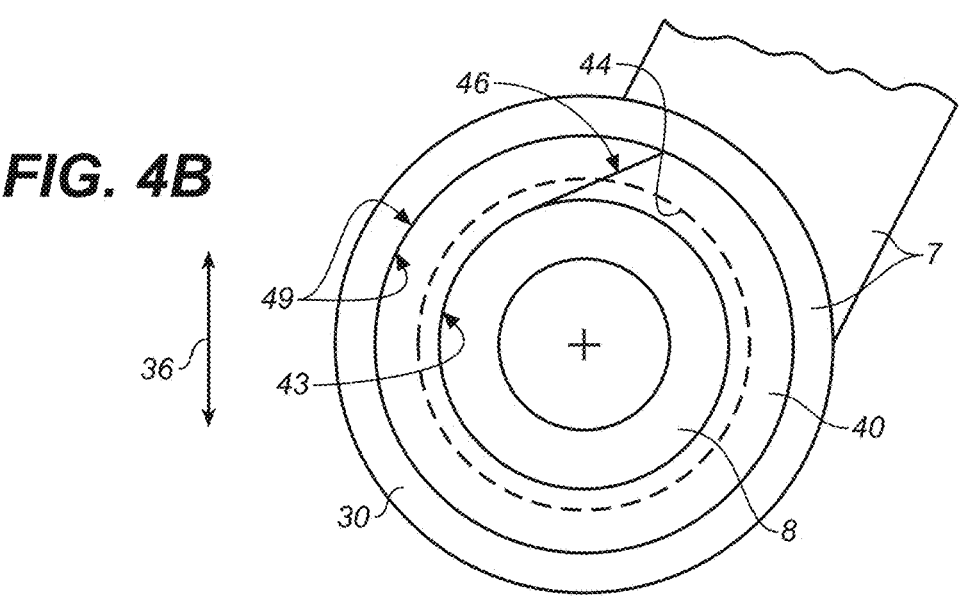
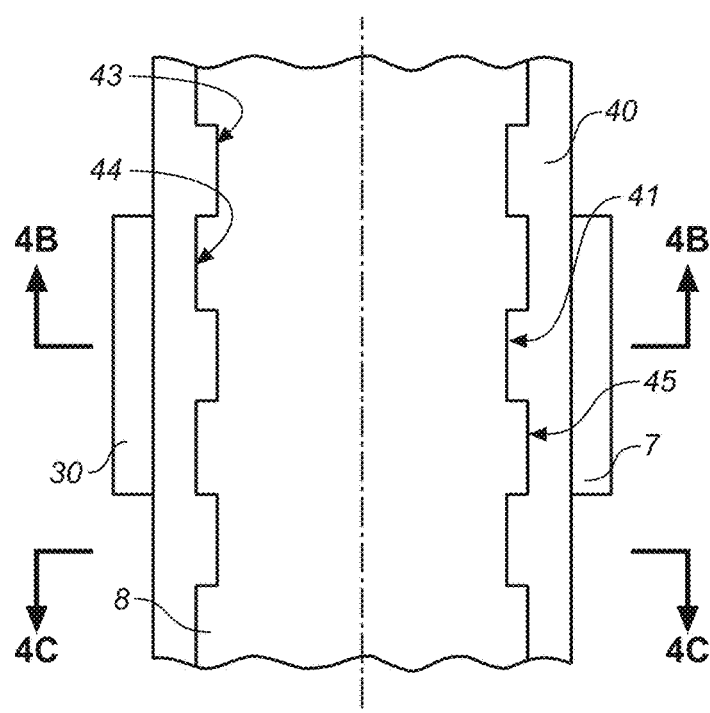
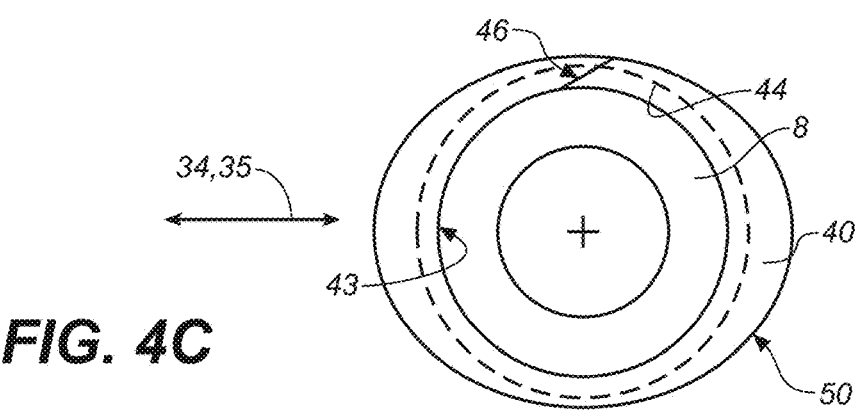

FIG. 5A
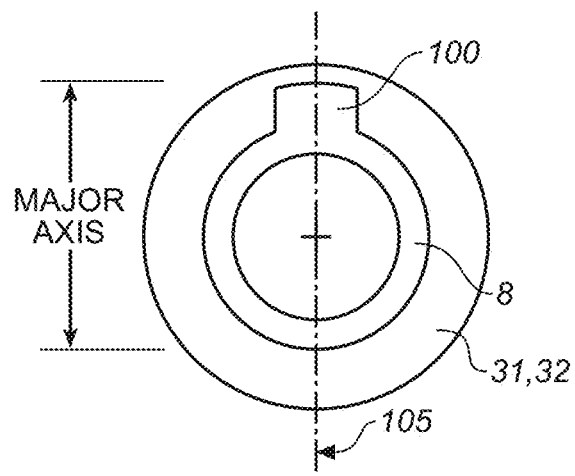
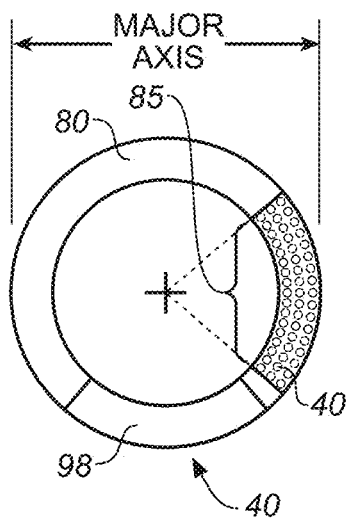
FIG. 5C
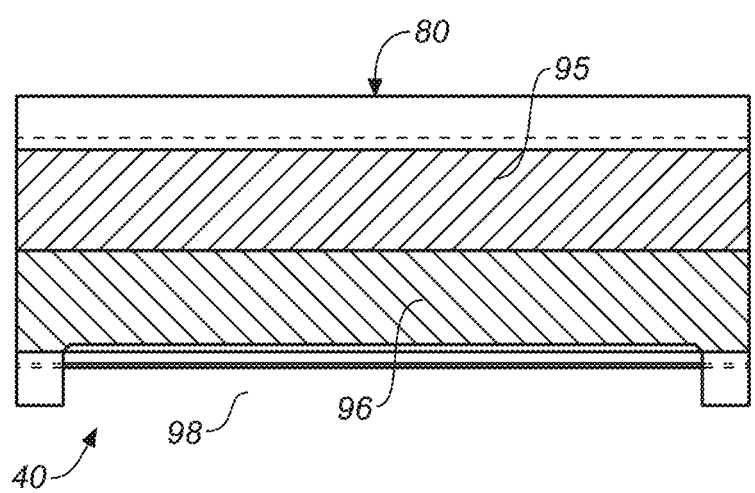
FIG. 5B

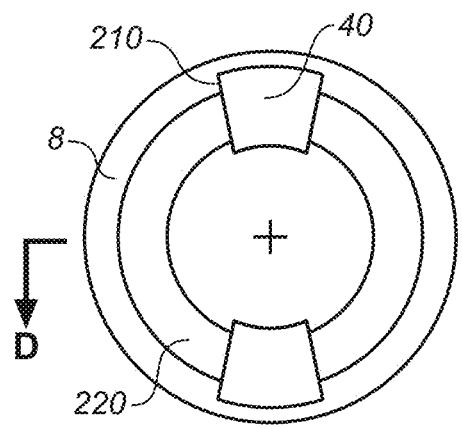
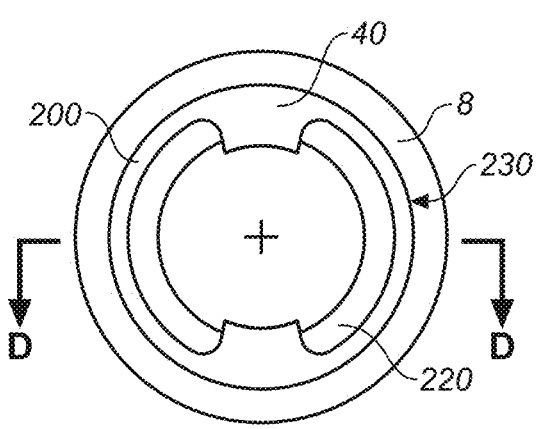
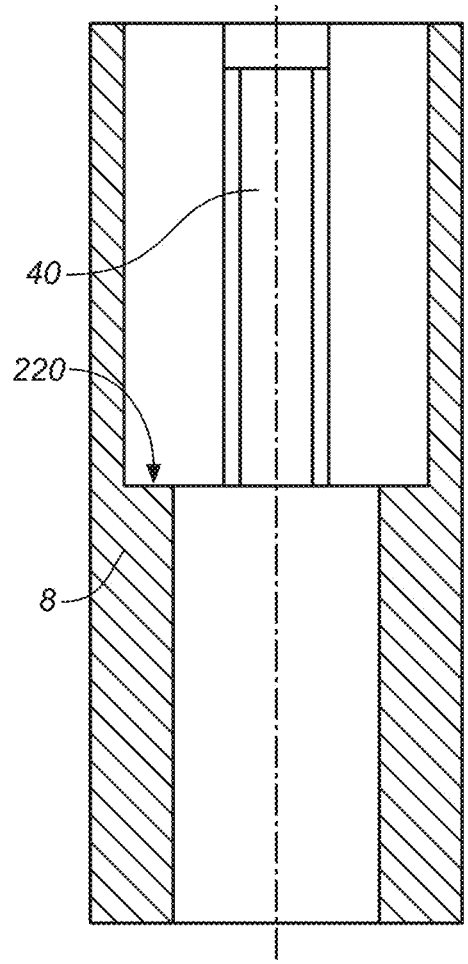
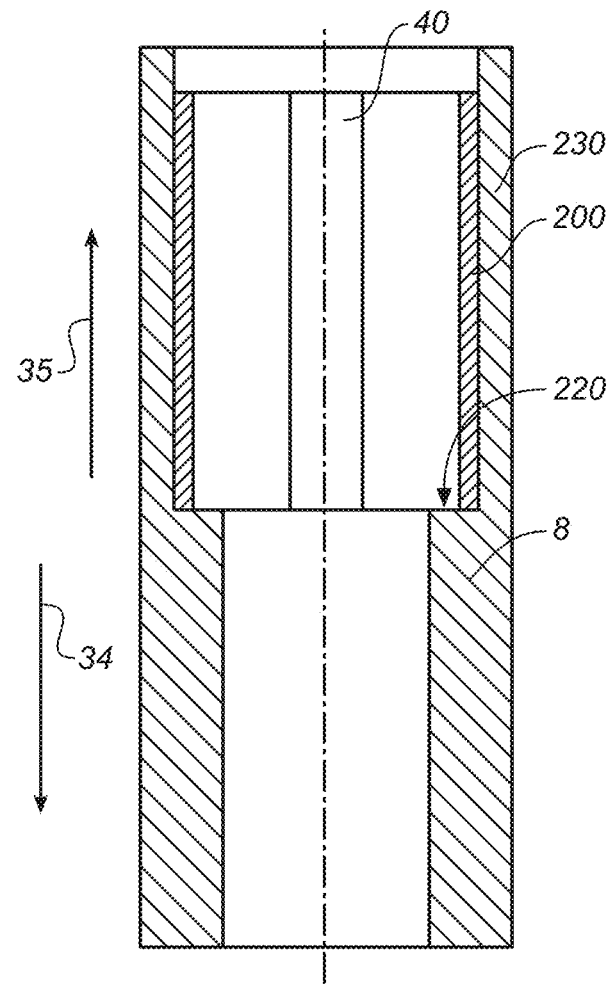
FIG. 6          FIG. 7

METHODS AND APPARATUS FOR SELECTIVE STIFFNESS OF VEHICLE SUSPENSION

CROSS-REFERENCE TO RELATED APPLICATIONS

This application is a continuation application of and claims the benefit of co-pending U.S. patent application Ser. No. 15/885,648 filed on Jan. 31, 2018 entitled "METHODS AND APPARATUS FOR SELECTIVE STIFFNESS OF VEHICLE SUSPENSION" by Mario Galasso, and assigned to the assignee of the present application.

The U.S. patent application Ser. No. 15/885,648 is a continuation application of and claims the benefit of U.S. patent application Ser. No. 14/708,027 filed on May 8, 2015, now U.S. Pat. No. 9,884,664, entitled "METHODS AND APPARATUS FOR SELECTIVE STIFFNESS OF VEHICLE SUSPENSION" by Mario Galasso, and assigned to the assignee of the present application.

The U.S. patent application Ser. No. 14/708,027 is a continuation application of and claims the benefit of U.S. patent application Ser. No. 13/646,041 filed on Oct. 5, 2012, now U.S. Pat. No. 9,051,022, entitled "METHODS AND APPARATUS FOR SELECTIVE STIFFNESS OF VEHICLE SUSPENSION" by Mario Galasso, and assigned to the assignee of the present application.

The U.S. patent application Ser. No. 13/646,041 claims the benefit of and claims priority of U.S. provisional patent application 61/543,730, filed on Oct. 5, 2011, by Mario Galasso, entitled "METHODS AND APPARATUS FOR SELECTIVE STIFFNESS OF VEHICLE SUSPENSION", now expired, and assigned to the assignee of the present application.

The U.S. patent application Ser. No. 13/646,041 is a Continuation-In-Part application of and claims the benefit and priority of U.S. patent application Ser. No. 12/623,788, filed on Nov. 23, 2009 by Galasso et al., entitled "METHODS AND APPARATUS FOR SELECTIVE STIFFNESS OF VEHICLE SUSPENSION," now U.S. Pat. No. 8,366,130, which claims the benefit of U.S. provisional application 61/117,090, filed Nov. 21, 2008, by Mario Galasso, entitled "METHODS AND APPARATUS FOR SELECTIVE STIFFNESS OF VEHICLE SUSPENSION" and U.S. provisional patent application 61/117,466, filed Nov. 24, 2008, entitled "METHODS AND APPARATUS FOR SELECTIVE STIFFNESS OF VEHICLE SUSPENSION," each of which are herein entirely incorporated by reference.

BACKGROUND

Embodiments of the invention generally relate to methods and apparatus for use in vehicle suspension. Particular embodiments relate to methods and apparatus useful for structural reinforcement of suspension components.

BRIEF DESCRIPTION OF THE DRAWINGS

FIG. 4A is a section view showing an alternative embodiment.

FIG. 4B is a section view of FIG. 4A taken through a line 4B-4B and FIG. 4C is a section view taken through a line 4C-4C.

FIG. 5A is a top view showing an alternative embodiment of a non-circular or non-round cross section of a stanchion FIG. 5B is a side view of a reinforcement having a substantially uniform wall thickness with a non-uniform modulus or stiffness distribution circumferentially and FIG. 5C is a top view thereof.

FIG. 6 is a side view showing a reinforcement bar that engages an inner surface of a stanchion and FIG. 6A is a top view thereof.

FIG. 7 is a side view showing a reinforcement ring having reinforcement lobes disposed within a stanchion and FIG. 7A is a top view thereof.

Figure 1:
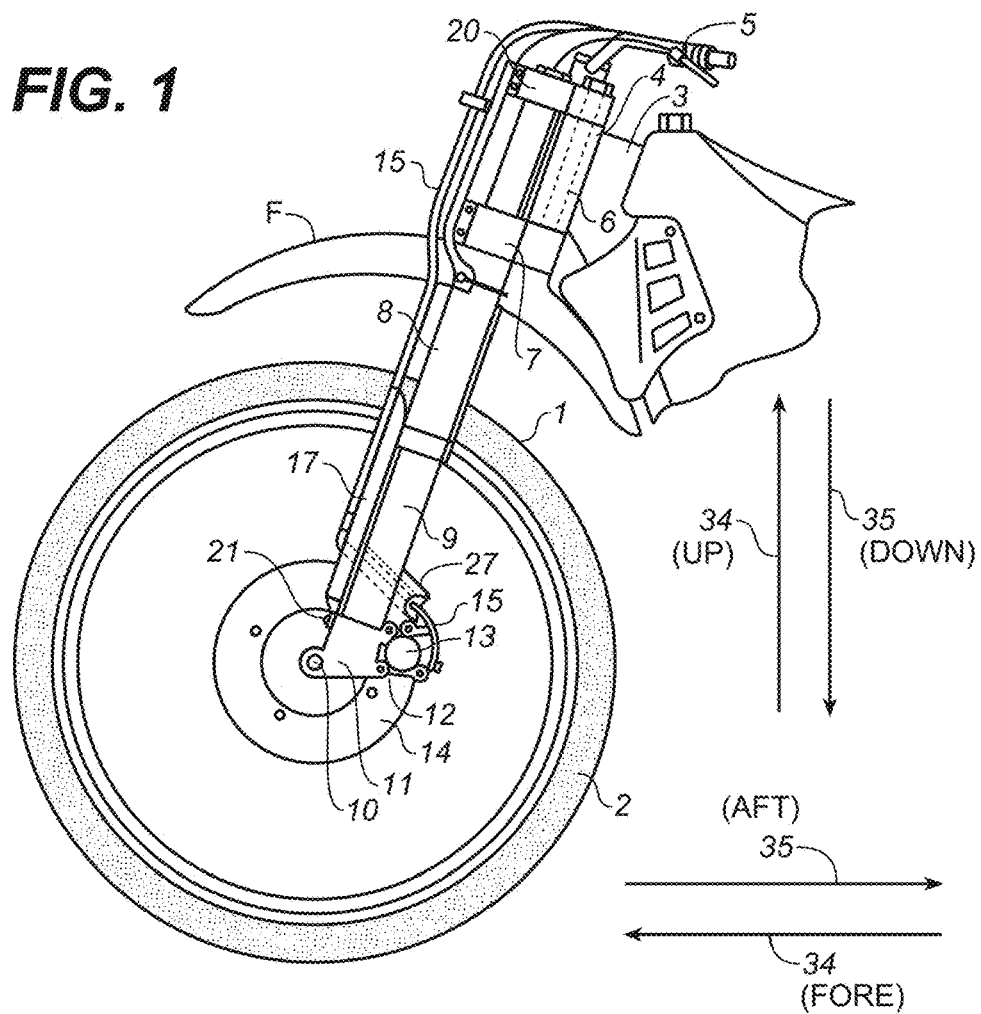
FIG. 1 is a side view of a motorcycle showing a front suspension

The drawings referred to in this description should be understood as not being drawn to scale except if specifically noted.

BRIEF DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is applicable to alternative embodiments, modifications and equivalents, which may be included within the spirit and scope of the invention as defined by the appended claims.

Furthermore, in the following description of embodiments, numerous specific details are set forth in order to provide a thorough understanding of the present technology. However, the present technology may be practiced without these specific details. In other instances, well known methods, procedures, and components have not been described in detail as not to unnecessarily obscure aspects of the present disclosure.

There are many types of vehicles that use suspension components for absorbing and dissipating energy imparted to the vehicle by the terrain over which the vehicle travels. Bicycles and motorcycles, particularly those designed for off road use, are used herein as examples of vehicles. The front fork of a bicycle or motorcycle most often includes the front suspension component of that vehicle.

Among riders and users (e.g., tuners, mechanics, designers) there is no consensus on fork chassis stiffness (resistance to flexing) requirements for off road motorcycles. Supercross (i.e., stadium style motocross) courses are generally smoother and are packed with manmade obstacles requiring precision and timing to negotiate them properly. The precision needed in supercross leads the riders to choose stiffer, more precise steering fork chassis. Professional supercross riders might, for example, prefer large diameter forks for supercross races. Outdoor motocross is generally very fast with a mix of man made and natural terrain obstacles. Outdoor motocross courses can get very rough. Professional outdoor motocross riders might, for example, prefer smaller diameter, less rigid, fork chassis to allow some compliance through flex of the front fork system. Top level youth riders also differ amongst themselves on fork chassis stiffness. Larger and more aggressive riders may look for more rigid fork systems. Lighter, smoother riders may prefer some flex in their fork system to provide more compliance.

Vehicle suspension systems typically include structures that must resist forces tending to bend and I or twist those structures. That means that the structures need to be designed structurally to properly handle anticipated loads. In many applications it would, however, be desirable to selectively adjust the reinforcement of the suspension to suit the needs of a particular user, the characteristics of the terrain to be traversed or both. What is needed is a structural reinforcement for a suspension component that is capable of being adjusted or "tuned" by a user.

Some embodiments disclosed herein provide a fork chassis that is tunable for stiffness. One aspect of stiffness where selective tuning is advantageous is front (fore) to back (aft) and up to down (e.g., fore and aft in FIG. 2A as directions 34, 35 respectively, and up and down directions in FIG. 1 and others as 34, 35 respectively) bending, or "beam," stiffness. A modern motocross fork is made up of 5 primary structural, or chassis, elements.

1. the lower/inner tube set (right and left sides of front wheel) commonly referred to as the sliders
2. the upper/outer tube set (telescopically engaged with the sliders) commonly referred to as the stanchions
3. the lower triple clamp
4. the upper triple clamp
5. the steering tube While the examples herein may often be described in reference to motorcycle or bicycle forks, the elements disclosed herein are suitable for use on a wide variety of vehicles and respective suspension systems.

Referring also to a fork as shown in U.S. Pat. No. 4,878,558, the main structural element defining the front to back stiffness in the above described motocross front fork is the stanchion tube set (note would be the slider tube set in an inverse fork set up). The region with the biggest affect on front to back (e.g., FIGS. 2A and 4C—34, 35) stiffness is the region below, through, and/or above the lower triple clamp (the "critical region"). It is noteworthy that some forks are essentially inverted from the above description in that the sliders are held within the triple clamp and the stanchions telescopically mounted below the sliders and thereby straddle the front wheel and engage with the front axle. The elements disclosed herein are equally suitable for use on either of the aforementioned fork configurations as well as other suspension configurations.

U.S. Pat. No. 4,878,558, assigned to Honda Giken Kogyo Kabushiki Kaisha and incorporated herein by reference in its entirety, describes an embodiment of a motorcycle fork and corresponding damage prevention covers for the inner tubes 9. That patent describes (and FIG. 1 herein shows by corresponding numbers) the stanchions as "outer cases 8" and the sliders as "inner tubes 9." That patent further describes the upper and lower triple clamps as "upper and lower brackets respectively as 7 (or 20 FIG. 1 herein), 7." It also refers to the steering tube as a "steering handle rotary shaft 6."

Figure 3:
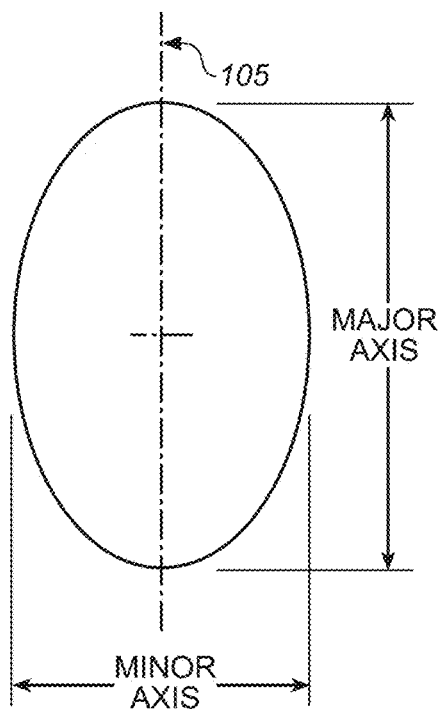
FIG. 3 is a drawing illustrating a major and minor axis of an elliptical shape.

U.S. Pat. No. 7,425,009, assigned to Showa Corporation and incorporated herein by reference in its entirety, describes the upper and lower triple clamp as the "upper bracket 15" and the "under bracket 16" respectively. It refers to the steering tube as the "steering shaft (not shown)." The stanchions are referred to as "outer tubes 13 and 13'" and the sliders are referred to as "inner tubes 14 and 14'." The Showa patent describes disc brake forces generated (directions shown in FIG. 3) on the disc side of the fork that are asymmetric in relation to the right and left sides of the fork. The Showa patent proposes a uniform increased thickness of the inner tube 14' of the disc side fork to increase stiffness of the brake side fork leg.

Other patents have dealt in various ways with various aspects of increased fork stiffness. U.S. Pat. No. 6,352,276, assigned to Marzocchi, USA, Inc. and incorporated herein by reference in its entirety, refers to a steering tube as a "stem tube 14", a lower triple clamp as a "crown 12" and a pair of "struts 16" corresponding to stanchions (because the '276 patent does not include suspension there are only stanchions and no sliders).

U.S. Pat. No. RE38,669 having inventors Darrell Voss and Gary Klein and being incorporated herein by reference in its entirety, refers to the lower triple clamp as "crown 6-3" and "stanchion tube 8-1 L." U.S. Pat. No. 5,908,200, assigned to Answer Products Inc. and incorporated herein by reference in its entirety, refers to the steering tube as "steering tube 12," lower triple clamp as "crown 14," stanchions as "lower tube 24" and the sliders as "upper tube 26." Noteworthy in the preceding two patents is that while bicycle forks may include an upper and lower triple clamp, they often include only the lower clamp or "crown."

U.S. Pat. No. 6,893,037, having inventor Mario Galasso and incorporated herein by reference in its entirety, refers to "steer tube 4," "crown 5," "stanchions 6" and "slider 10" as the respective parts of the fork.

It is noted that, regarding vehicles that employ fork type front suspension; while mounting stanchions to the steering head is quite common particularly on motorcycles, certain types of vehicles still use forks having sliders mounted to the steering head with the stanchions attached to the suspended wheel. The fork reinforcement embodiments disclosed herein are equally well suited for use with stanchions or sliders as mounted to a vehicle steering head. Reference herein to stanchions or sliders is for illustrative purposes only. Also noteworthy is that some suspension "forks" are asymmetrical and comprise only one stanchion/slider set, held by one triple clamp set and traversing only one side of a suspended wheel. The embodiments herein a well suited for use on only one stanchion/slider pair. Further, embodiments herein are suitable for use with vehicle forks having no stanchion I slider pairing such as that shown in U.S. Pat. No. 6,145,862, which patent is incorporated herein, in its entirety, by reference. That '862 patent includes a bicycle fork, that while suspended in a head tube arrangement, comprises no moving parts in the fork struts. Embodiments disclosed herein may nonetheless be useful in selectively stiffening or reducing stiffness in single piece forks. Additionally, as shown in U.S. Pat. No. 4,170,369, which patent is incorporated herein, in its entirety, by reference, a "fork" need not comprise more than a single strut (noting that each of a stanchion and a slider is a "strut" and together the form a telescopic "strut" or strut assembly). Embodiments herein may nonetheless be used in conjunction with such single strut type forks whether the single strut includes a suspension component or not.

Figure 2A:
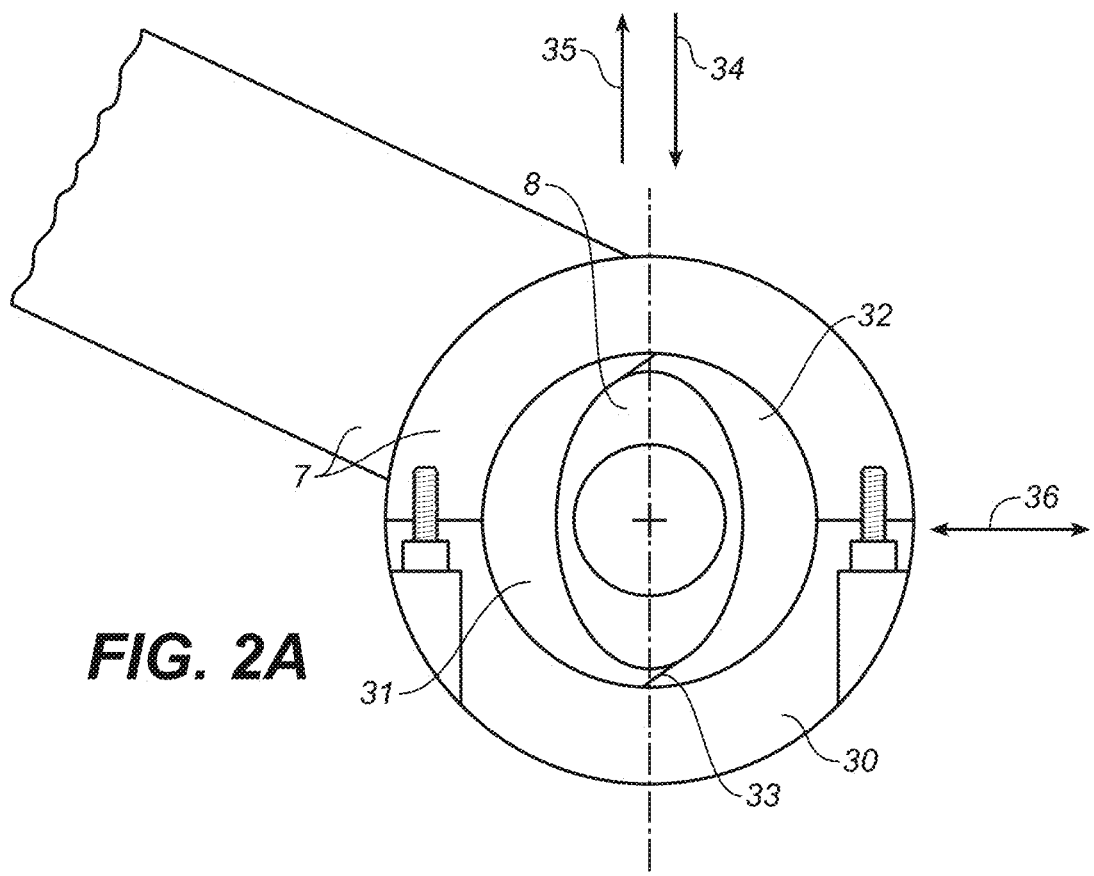
FIG. 2A is a sectional top view of FIG. 2, take through a line 2A-2A.
Figure 2:
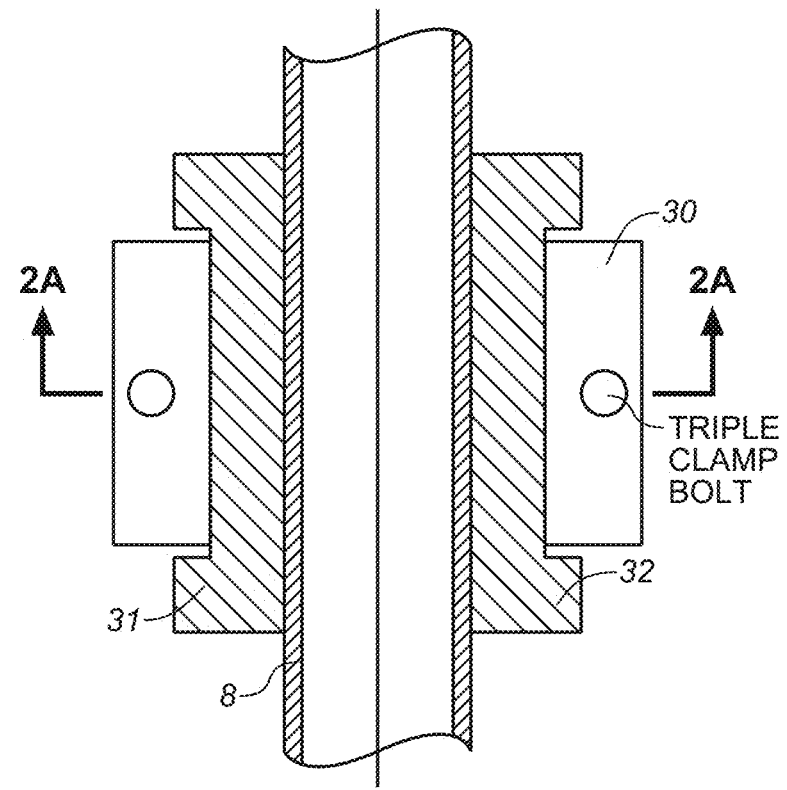
FIG. 2 is a section view showing one embodiment.

In one embodiment, shown in FIG. 1 of the present application, the stanchions 8 are held in the lower triple clamp 7 and the upper triple clamp 20. Referring to FIGS. 2 and 2A, while the inner diameter of the stanchions 8 is circular, at least a portion of the length of the stanchions has an elliptical outer surface. As shown in FIG. 2A the stanchion 8 is positioned in relation to lower triple clamp 7 such that the major elliptical axis (refer to FIG. 3) of the stanchion 8 is substantially aligned with the forward 34 and aft 35 directions of the bicycle or motorcycle. The lower triple clamp parts 7 and 30 engage to form a substantially circular clamped region. The split bushing 31, 32 adapts the elliptical outer surface of the stanchion 8 to be clamped by the circular inner surface of lower triple clamp 7. The split bushing 31, 32 is scarf cut 33 in two places (or cut in any other suitable manner) at approximately 180 degrees. That allows the split bushing 31,32 to tightly transfer clamping force from the triple clamp 7 to the stanchion 8 by
mitigating substantial part tolerance issues that might otherwise interfere. In one embodiment the bushing comprises a substantially incompressible elastic material (e.g. rubber, urethane) and will transfer clamping force there though by means of an iso-static pressure created therein by the clamping force (based on bulk modulus of the material). As such a scarf out is not always necessary. With the stanchion 8 and split bushing 31, 32 in place, the triple clamp 7, 30 is tightened by means of the triple clamp bolts as shown.

In one embodiment the cross section for the stanchion tube 8 in the critical region is non round. One example of a suitable non-circular or non-round cross section is shown in FIG. 5A. The stanchion 8 includes a "lobe" or beam web 100 (running axially along a length of the stanchion but not shown) which enhances axial bending stiffness of the stanchion 8 along plane 105 (plane 105 shown as line 105 and extending into and out of the page). The lobe may be any suitable cross sectional shape and may be located circumferentially at a single zone or the stanchion may comprise a plurality of lobes located for example at 180 degrees or other suitable locations for enhancing selected bending stiffness of the stanchion 8. For purposes of this description the non round cross section may be elliptical (referring to FIG. 3) although practically it may be any other suitable cross section (i.e., consistent with selective reinforcement). The raw material for the stanchion 8 may be a tube with round ID and elliptical OD. Below the axially, or lengthwise, lowest desired elliptical section of the tube, the tube may be machined to have a round OD in order to reduce weight where the elliptical cross section contribution is not needed. Above the upper most elliptical cross section, the tube may include a round OD, if desired, so that the interface with the upper triple clamp 20 is simpler. Referring to FIGS. 2 and 2A, a split shim 31, 32 is mounted in the lower triple clamp 7, 30. The OD of this shim 31, 32 is round. The ID of this shim 31, 32 is elliptical and fits over the elliptical OD of the stanchion tube 8. In essence, this composite cross section of stanchion 8 and shim 31, 32 results in a round OD interface with the lower triple clamp 7, 30. The round, or circular, interface helps facilitate ease of rotation (e.g. adjustment) of the stanchion relative to the clamp when altered fork stiffness characteristics are desired. When the major axis (note the term "major axis" herein refers not only to the dimensionally larger cross sectional axis but also to any axis including the plane of increased stiffness 105) of the stanchion 8 is aligned parallel to the center plane 34, 35 of the vehicle (e.g. motorcycle, bicycle), the fork will be in its stiffest front to rear setting. That is consistent with cross sectional moment of inertia calculations and beam stiffness calculations presuming the major axis to comprise the web of a cross sectioned beam. It is noteworthy that the cross section of the stanchion may vary and include many suitable shapes or combinations thereof (e.g., rectangle, I beam web). The "web" or cross sectional extension may exist on only one side of the stanchion 8 thereby forming in one embodiment a "tear drop" shaped cross section.

In one embodiment, when stanchion 8 is rotated approximately 90 degrees relative to the triple clamp 7, 20 such that the minor axis of the stanchion 8 is aligned with the center plane 34, 35 of the motorcycle, the fork will be in its' least stiff front to rear setting. Laser etching datum marks, or other suitable marking may be provided on the lower triple clamp 7, 30 and on the outside of the stanchion 8 to allow the rider to readily line up the major or minor axes in the desired orientation (e.g., front to rear stiff or front to rear flexible corresponding with the major and minor axis alignment respectively with plane 34, 35). As is shown the triple clamp 7, 30 and 20 may be loosened and the rider/user can rotationally orient the major axis of the stanchion 8 in line with front rear vehicle plane 34, 35 for maximum fork stiffness or laterally 36 for maximum fork flexibility or at orientations in between for corresponding intermediate stiffness.

In one embodiment, and referring to FIGS. 4A-C, stanchion 8 (or slider if inverse fork arrangement) has a circular inner diameter and a circular outer diameter. The outer diameter of stanchion 8 is scribed with grooves 41 at intervals along its length over a region of desired stanchion support. In between the grooves 41 are circumferential raised (relative to the groove depth—e.g. full stanchion OD) diameter portions 45 (optionally 41/45 may comprise a selected thread form). Fitted around the exterior of the stanchion 8 axially along the length of a region of desired selectable enhanced support, is reinforcement 40. For initial installation reinforcement 40 is spread, at scarf cut 46, to fit over stanchion 8. Reinforcement 40 may comprise two cuts at suitable relative angles, such as 180 degrees (in other words reinforcement 40 may comprise two pieces), thereby avoiding any need to flex the reinforcement 40 during installation. Reinforcement 40 has spaced inner grooves 44 and smaller intervening ID portions 43 that engage respectively with raised diameter portions 45 and grooves 41 of the stanchion. Once the reinforcement 40 is installed on stanchion 8 it is rotatable there about. With the triple clamp 7, 30 (and 20 if reinforcement extends that far) loose the major axis of the reinforcement can be selectively aligned with the vehicle front/rear plane 34, 35 to provide maximum fork stiffness or with lateral plane 36 to provide minimum stiffness. It may also be aligned at intermediate positions. With the reinforcement 40 in the desired orientation, the triple clamp 7, 30 is tightened around the reinforcement 40 which in turn tightens around stanchion 8 thereby retaining the stanchion and the preferred orientation of the reinforcement 40. As shown in FIG. 4B the outer surface 49 of the reinforcement 40 is circular in the axial region within (i.e. corresponding to the length of) the triple clamp 7, 3D. As demonstrated by FIG. 4C, the reinforcement 40 has an elliptical outer surface at axial locations on either side of the triple clamp 7, 30. The inner surface 49 of the triple clamp 7, 30 is circular so as to substantially engage the circular outer surface 49 of the reinforcement 40 (within the triple clamp). The engaged circular surfaces 49 facilitate rotation of reinforcement 40 within the loosened triple clamp 7, 30 and gripping retention of reinforcement 40, by the tightened triple clamp 7, 30 in any selected relative rotational orientation between the reinforcement and the clamp. Additionally, the inner surfaces of the reinforcement 40 are substantially circular to engage the circular outer surface of the stanchion 8. The engaged grooves 41, 43 and 44, 45 provide axial lengthwise shear area thereby transferring bending forces between the stanchion 8 and the reinforcement 40 (as inter-part surface shear and hence enabling the reinforcement to aid in stiffening the stanchion). Note that other suitable axial shear transfer mechanisms may be employed such as, for example, axially spaced clamps where inter-part friction is the shear transfer mechanism or through bolts where headed bolts are disposed in holes though the reinforcement 40 and threaded into the stanchion (alternative holes threaded into stanchion at 90 degrees to facilitate rotation and retained orientation of the reinforcement 40. Depending on the axial length of the critical region (e.g. desired engagement length between reinforcement 40 and stanchion 8) addition axially spaced clamps may be preferred. Such clamps may be placed around the reinforcement at selected axial locations to retain the reinforcement 40 grooves 44 in contact with the raised portions 45 of the stanchions. Clamps and grooves may be used separately or in combination for added shear force transfer.

One embodiment comprises providing an "add on" reinforcement or stiffening element 40 that may be added to (and fixed to) an exterior of a stanchion tube 8 of a fork chassis. In one embodiment the stiffener or reinforcement 40, when in use to enhance fork stiffness, is mounted on the front facing 34 side of the fork and is mounted to the stanchion tubes 8 below the lower triple clamp 7, 30 and above the lower triple clamp 7, 30. Optionally the stanchion 8 can provide mounting provisions for the stiffener 40 to directly bolt/mount to the tube 8, or secondary clamps (not shown) may be used to mount around the reinforcement. 40 and stanchion 8 to affix the stiffening element 40 to the front side 34 of the fork. The stiffening element 40 can be produced from a variety of materials, including carbon fiber reinforced composite, injection molded plastic, stamped/formed aluminum, metal matrix composite, work hardened and heat treated brass, steel, titanium, magnesium, or any suitable material or combination thereof. It is noteworthy that reinforcement 40 need not circumvent the stanchion 8 and in fact may only be on the forward 34 side of the stanchion 8 (in other words the reinforcement 40 may be embodied as a "half shell" spanning only 180 degrees of a circumference or less, or more). Such reinforcement 40 would look like the left half of that stiffener 40 as shown in FIG. 4A and may be used in conjunction with a retaining mechanism such as for example axially spaced clamps, or bolts (e.g. bolted directly to the stanchion or slider) along a length of the critical region of desired enhanced stiffness to retain the reinforcement 40. The reinforcement 40 need not traverse the triple clamp 7 and may be only above or below (or both) that clamp 7. In one embodiment the reinforcement 40 is retained at an upper end under the upper triple clamp and at a lower portion under the lower triple clamp. In one embodiment (e.g. a single crown bicycle fork) the reinforcement 40 extends below the crown or single lower fork leg clamp and supports a portion of the fork leg there below. An axially spaced bolt hole pattern may be built into the stanchion on a forward 34 or rear 35 face and on a lateral face 36 such that a bolt on reinforcement may be moved from front to side with a bolt arrangement. Alternatively a front 34 bolt on reinforcement 40 and the reinforcement 40 itself may merely be removed from the fork leg when more fork flexibility is desired. The reinforcement may be located on the stanchion 8 or the slider or both. It may be placed only between the upper and lower triple clamp and in one embodiment does not engage the triple clamps at all. The reinforcement 40 may be used on any of a variety of beam loaded (e.g. beam supported) vehicle suspension members.

In one embodiment, referring to FIGS. 5B-C, the reinforcement 40 comprises a substantially circular tube 80 having a substantially uniform wall thickness (e.g. no major or minor dimensions) where the wall has a non-uniform modulus (stiffness) distribution circumferentially. Generally, as described herein, non-uniform modulus distribution may result from: 1) dimensional variations; material variations (including local modulus and/or strength characteristics); or 3) suitable combinations of material and dimensional variations. In one embodiment the reinforcement 40 comprises a material or material combination resulting in varying degrees of axial (e.g. lengthwise) bending stiffness at varying locations circumferentially. In one embodiment a carbon fiber filled composite reinforcement 40 comprises a circumferential zone 85 of, for example, approximately 90 degrees (e.g. a quadrant) that is axially reinforced with a higher modulus carbon fiber 90 than the remaining circumferential structure of the reinforcement 40. Such reinforcement results in a zone of high stiffness 85. Such a zone may comprise, for example, 90 degrees, 180 degrees, 45 degrees or any suitable zone angle (or no particular angle per se) for enhancing bending stiffness in a selected zone (and hence orientation). The zone may comprise a continuous reinforcement fiber (e.g. axial 96 or orientated 95), chop random fiber, granular, oriented short, fabric, or any suitable filler for increased structural stiffness. In one embodiment the tube 80 includes a high stiffness zone that comprises a base material having a property of high modulus relative to the base material of the remainder of the tube 80. In one embodiment the tube 80 is made from a material having varying states of stiffness around its circumference. Such varying state stiffness zones may be created for example by selective heat treating. In one embodiment a high strength tube is manufactured having a first stiffness and a zone of that tube is heat treated, using for example localized induction heating, (with a corresponding modulus change such as multiphase brass) leaving a high stiffness zone in the non-annealed area. In one embodiment (not shown) two such high modulus reinforced zones are positioned diametrically opposite one another, for example at 180 degrees apart circumferentially. In one embodiment the reinforcement 40 comprises a suitable combination of selective high modulus construction or reinforcement and a major and minor dimension in cross sectional profile (e.g. non-circular shape plus coincident high stiffness zone. It is noteworthy that the circular cross section reinforcement 40 as described herein would be suitable for use as described herein without any accommodation for non circular cross section in any clamping mechanism. In one embodiment, referring to FIGS. 5B-C, a "window" 98 of material is removed or reduced from a wall or walls of the tube 80 corresponding to a zone(s) of reduced stiffness (thereby leaving a zone(s) of high stiffness). Shapes, materials and concepts disclosed herein regarding either stanchions (sliders) or stanchion (slider) reinforcement members are described in reference to one or the other but the reinforcement and stiffness zone creation mechanisms disclosed herein are, for the most part, equally well suited to use directly with a stanchion or slider, or as part of a stanchion or slider reinforcement member.

In one embodiment, the reinforcement is part of the fork leg assembly. Referring to FIGS. 6 and 7, the reinforcement 40 is inside, for example, the stanchion 8. Note that directions 34 and 35 are fore and aft respectively as related to the top views of each FIGS. 6A and 7A. In one embodiment (referring to FIGS. 6 and 6A) reinforcement 40 comprises one or more "bars" which engage an inner surface of the stanchion 8 by means of dovetail form slots 210 therein. The reinforcement bars 40 are retained radially (e.g. from falling inward) and rotationally, in selected orientation, by the dovetail slots 210 and retained at a lower end by circumferential shoulder 220 within the stanchion 8. The bars 40 may be retained at an upper end by a top cap (not shown) of the stanchion 8. When one or more bars 40 are in place in a plane residing in the fore 34/aft 35 direction, they enhance the stiffness of the stanchion along the length in which they are disposed. When more stanchion flexibility is desired, a user may merely remove the reinforcement bar(s) 40.

Referring to FIGS. 7 and 7A, a reinforcement ring 200 comprises reinforcement lobes 40. The ring 200 and its lobes 40 are disposed within the stanchion 8 and are retained axially upon an inner shoulder 220. The reinforcement ring 200 may be axially retained at an upper end by a stanchion top cap (not shown). The reinforcement ring may be rotated within the stanchion to alter the stiffness of the stanchion in the fore 34/aft 35 direction. The outer surface of the ring 200 and the inner surface of the stanchion 8 may be interengagably splined along at least a portion of interface 230 so that the spline engagement (e.g. axially oriented "teeth" such as fine gear teeth) retains selected orientation between the ring 200 and the stanchion 8. In order to change the orientation, the ring 200 may be withdrawn axially upward (following removal of the stanchion top cap for example) until the splines at 200 are no longer engaged. The ring may then be rotated and re-orientated consistent with the indexing of the splines and replaced within the stanchion (the top cap or other retainer may then be replaced).

While embodiments herein have been described in reference to front vehicle suspension and specifically vehicle "forks" it is noted that the concepts hereof including embodiments of reinforcement 40 are suitable for use with fork lower assemblies, stanchions, shock absorbers (including integral damper and spring assemblies) other suspension types.

Embodiments of a Skin Member

Figure 8A:
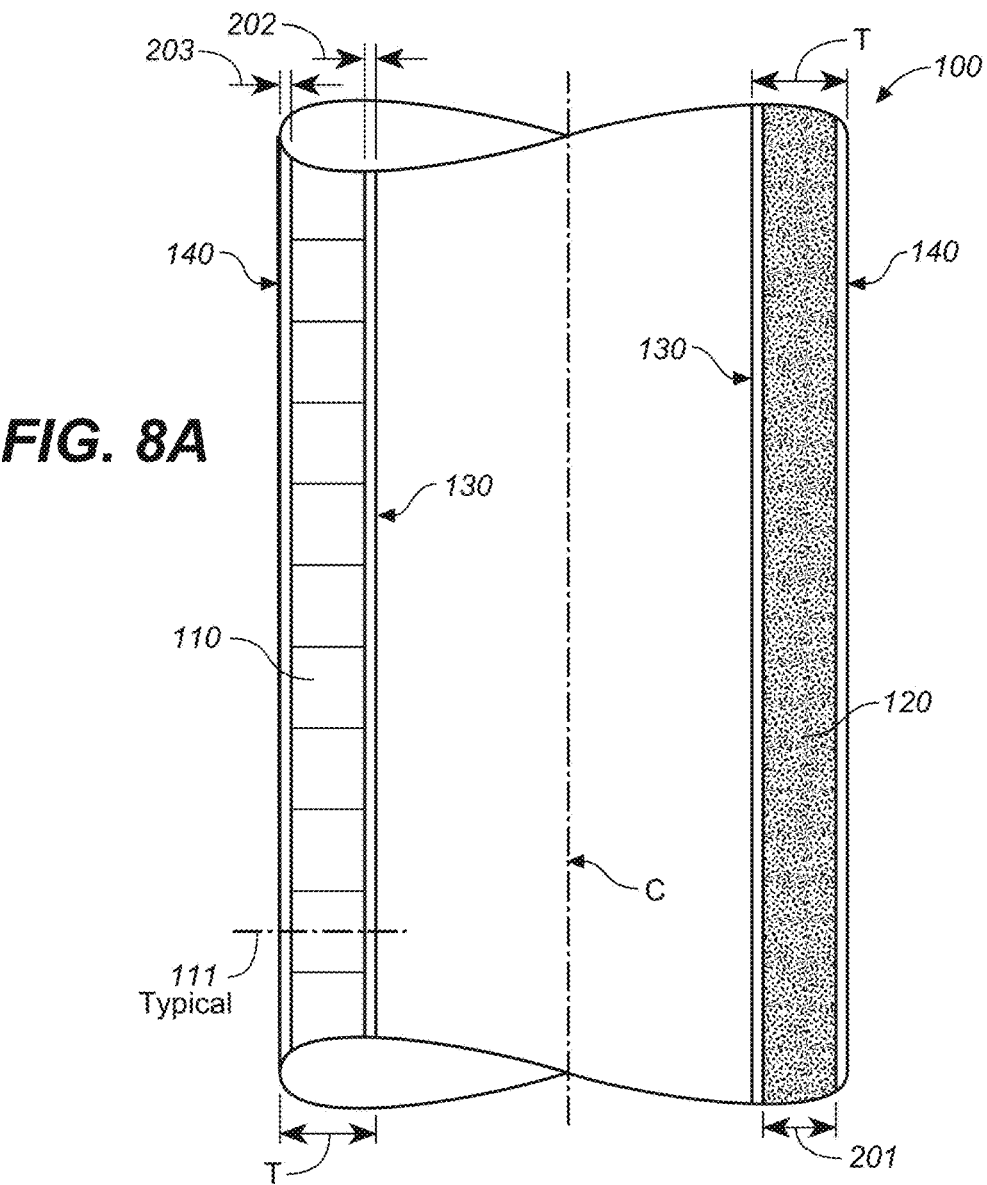
FIGS. 8A-B is depict embodiments of a core and skin members.
Figure 8B:
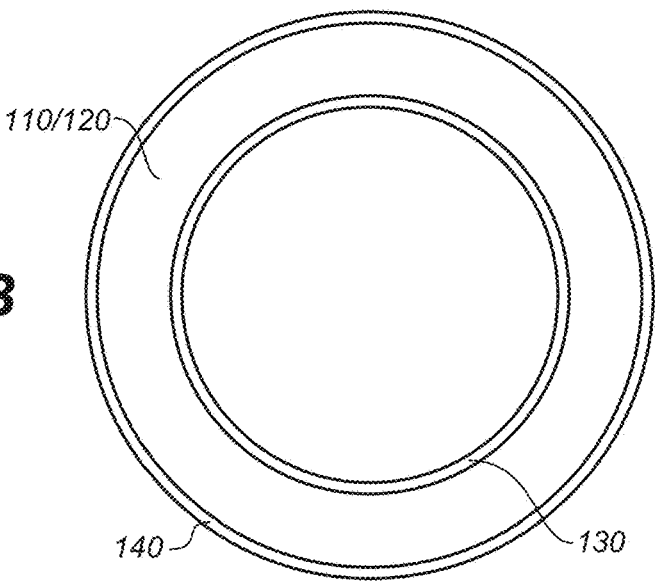

In one embodiment, shown in FIGS. 8A-B of the present application, a tube form 100 is shown, about axial centerline C, in section having generally a wall thickness T comprising a core 110 and/or 120. The wall T may further comprise either one of inner skin 130, outer skin 140 or both. The tube form 100 may be suitably used as a structural portion of any suitable suspension assembly such as for example a fork stanchion or slider, a fork lower leg or outer, a shock absorber damper body, air sleeve, linkage member, shock eyelet, shock air sleeve, etc. Tube form 100 may be any structure in a suspension system, for example, any structure as described above.

In one embodiment the core 110 of the tube form comprises a honeycomb structure having cells with radially oriented center axis (as shown by axis centerline 111). Such cells may be octagonal, hexagonal or any other suitable compound cell type. One honeycomb structure is described in U.S. Pat. No. 4,124,208 which is entirely incorporated herein by reference. The honeycomb core 110 may comprise metal, polymer, ceramic, plastic, composite or any suitable combination thereof or other structural material.

In one embodiment the core 120 comprises a solid or foam structure. The solid or foam may have necessary structural characteristics or may be sacrificial (such as for example the wax in a lost wax casting process). In one embodiment the foam is a foamed metal or metal composite. In one embodiment the foam is a polymer or polymer composite. The foam or solid may be metal, ceramic, polymer, composite or any suitable combination thereof or other material. In one embodiment the core 120 has a melting temperature that is lower than the melt temperature one of the inner skin 130, the outer skin 140 or of both 130 and 140. Foamed metal and foamed composite structures are described in U.S. Pat. Nos. 5,112,697 and 7,641,984, each of which is entirely incorporated herein by reference.

In one embodiment the tube form 100 has a net structural strength and/or stiffness requirement (or other net physical property requirements such as fatigue life, external or internal coefficient of friction) and a substantial portion (or all of) the physical property requirement is met by at least one of the inner and outer skin or both in combination. As such the core may be extremely non-dense or may even be removed (e.g. melted out) once the inner and outer skins are adequately positioned thereby rendering the net tube form as comprising primarily the skin members.

In one embodiment inner 130 and/or outer skin 140 comprise a nano-crystalline metal structure or metal composite. Such metal layers and methods for depositing such metal layers on core structures are described in U.S. Pat. Nos. 5,352,266, 5,433,797, 7,320,832, 7,387,578, 7,354,354, and 7,771,289, each of which patents is entirely incorporated herein by reference.

In one embodiment the tube form core is formed to be a structurally contributing member but is formed of a material that does not, as formed for example to thickness 201, include all of the required net tube form 100 properties. One or more skins 130, 140 are deposited, comprising suitable material makeup, on to core 110/120 to bring the tube form 100 up to net property requirement compliance. In one embodiment the core 110/120 is formed to a net dimension 201 that is less than the required tube form 100 net dimension from either or both of a structural perspective or a dimensional perspective and the difference is made up by a deposited coating of one or both of skin 130 and 140.

In one embodiment the inner skin 130 has at least one different material property than the outer skin 140. In one embodiment one or both of the inner and outer skin have at least one different property than the core. In one embodiment the different property is at least one of modulus, tensile strength, fatigue strength, hardness, coefficient of friction.

In various embodiments, the core material is structurally insufficient on its own. The core can be plated by the skins creating a thin and efficient structural skin. As such, the combination of the core and the skin(s) are structurally sufficient. In one embodiment, only the skin(s) are structurally sufficient.

In particular, the core is a structurally insufficient geometry defining core while the skin or skins are structurally efficient. Accordingly, the skin member provides stiffness to the suspension assembly such that the suspension assembly is structurally sufficient and meets material structural requirements for actual use of the suspension assembly.

While embodiments herein have been described in reference to front vehicle suspension and specifically vehicle "forks", having inner and outer sliding tubes, it is noted that the concepts hereof including embodiments of reinforcement are suitable for use with other suspension linkages such as rear (e.g. motorcycle, bicycle) swing arms, frame struts and other structural vehicle members where user selectable stiffness is desirable. In many circumstances contemplated herein, the terms fore and aft, as used herein, also apply to "up and "down" respectively because the plane that extends front (fore) and back (aft) also extends up and down relative to a vehicle. That is appropriate because vehicle suspension and linkage often operate substantially in the plane perpendicular to the surface being traversed by the vehicle (e.g. up and down) and bending forces encountered by the suspension derive from force components in the "up and down" directions.

What we claim is:

1. A suspension assembly having adjustable structural reinforcement, said suspension assembly comprising:
   a first tube;
   a second tube, said second tube at least partially inside of said first tube;
   at least a portion of said first tube having a non-circular outer diameter, wherein a change in rotational position of said first tube with respect to said second tube alters said structural reinforcement of said suspension assembly; and
   a triple clamp, the triple clamp configured to be tightened around said first tube at a first axial location of said first tube, thereby retaining said first tube in a desired orientation, said non-circular outer diameter of said first tube providing said adjustable structural reinforcement of said suspension assembly.

2. The suspension assembly having adjustable structural reinforcement of claim 1, wherein said first axial location of said first tube has a circular outer diameter.

3. The suspension assembly having adjustable structural reinforcement of claim 1, said suspension assembly further comprising:
   a second triple clamp, said second triple clamp configured to be tightened around said first tube at a second axial location of said first tube, said second triple clamp further retaining said first tube in said desired orientation.

4. The suspension assembly having adjustable structural reinforcement of claim 3, wherein said second axial location of said first tube has a circular outer diameter.

5. The suspension assembly having adjustable structural reinforcement of claim 1, wherein said first axial location of said first tube has said non-circular outer diameter.

6. The suspension assembly having adjustable structural reinforcement of claim 5, further comprising:
   a bushing disposed between said triple clamp and said first axial location of said first tube.

7. The suspension assembly having adjustable structural reinforcement of claim 3, wherein said second axial location of said first tube has said non-circular outer diameter.

8. The suspension assembly having adjustable structural reinforcement of claim 7, further comprising:
   a bushing disposed between said second triple clamp and said second axial location of said first tube.

9. The suspension assembly having adjustable structural reinforcement of claim 3, further comprising:
   said first axial location of said first tube having said non-circular outer diameter; and
   said second axial location of said first tube having said non-circular outer diameter.

10. The suspension assembly having adjustable structural reinforcement of claim 9, further comprising:
    a bushing disposed between said triple clamp and said first axial location of said first tube.

11. The suspension assembly having adjustable structural reinforcement of claim 9, further comprising:
    a bushing disposed between said second triple clamp and said second axial location of said first tube.

12. The suspension assembly having adjustable structural reinforcement of claim 9, further comprising:
    a bushing disposed between said triple clamp and said first axial location of said first tube; and
    a bushing disposed between said second triple clamp and said second axial location of said first tube.

13. A suspension assembly having adjustable structural reinforcement, said suspension assembly comprising:
    a first tube;
    a second tube, said second tube at least partially inside of said first tube; and
    at least a portion of said first tube having a non-circular outer diameter, wherein a change in rotational position of said first tube with respect to said second tube alters said structural reinforcement of said suspension assembly.

14. The suspension assembly having adjustable structural reinforcement of claim 13, said suspension assembly further comprising:
    a triple clamp, said triple clamp configured to be tightened around said first tube at a first axial location of said first tube, thereby retaining said first tube in a desired orientation, said non-circular outer diameter of said first tube providing said adjustable structural reinforcement of said suspension assembly.

15. The suspension assembly having adjustable structural reinforcement of claim 14, said suspension assembly further comprising:
    a second triple clamp, said second triple clamp configured to be tightened around said first tube at a second axial location of said first tube, said second triple clamp further retaining said first tube in said desired orientation.

16. The suspension assembly having adjustable structural reinforcement of claim 15, further comprising:
    said first axial location of said first tube having said non-circular outer diameter;
    a bushing disposed between said triple clamp and said first axial location of said first tube; and
    said second axial location of said first tube having said non-circular outer diameter.

17. The suspension assembly having adjustable structural reinforcement of claim 15, further comprising:
    said first axial location of said first tube having said non-circular outer diameter;
    said second axial location of said first tube having said non-circular outer diameter; and
    a bushing disposed between said second triple clamp and said second axial location of said first tube.

* * * * *